United States Patent [19]

Stone

[11] Patent Number: 5,321,397
[45] Date of Patent: Jun. 14, 1994

[54] DATA ENCODER FOR PRODUCING AND STORING INFO RUNLENGTH VALUE, BIT LENGTH VALUES AND ENCODED WORDS FROM INPUT DATA VALUES

[75] Inventor: Jonathan J. Stone, Reading, United Kingdom

[73] Assignee: Sony United Kingdom Limited, Staines, United Kingdom

[21] Appl. No.: 950,896

[22] Filed: Sep. 25, 1992

[30] Foreign Application Priority Data

Oct. 4, 1991 [GB] United Kingdom ............... 9121124

[51] Int. Cl.$^5$ .............................................. H03M 7/46
[52] U.S. Cl. ........................................ 341/59; 341/67
[58] Field of Search ................ 341/59, 63, 65, 67, 341/87, 95, 101; 358/261.1, 426, 261.2

[56] References Cited

U.S. PATENT DOCUMENTS 4,968,135 11/1990 Wallace et al. .................. 358/261.1

FOREIGN PATENT DOCUMENTS 0070387 1/1983 European Pat. Off. .

Primary Examiner—Brian K. Young
Attorney, Agent, or Firm—William S. Frommer; Alvin Sinderbrand

[57] ABSTRACT

A data encoder is described for carrying out runlength coding. A count of zero input data values is made by a runlength counter 10. The input data values are simultaneously fed to a encoded word bit length indicator 6 and encoded word generator 8 which respectively produced outputs for each input data value. An encoder state machine 12 triggers the reading into an encoder data store 16 of the current runlength, encoded word bit length and encoded word at appropriate times. The encoder state machine triggers storage when a non-zero input data value is received. The encoder state machine 12 also prompts the generation and storage of continuation codes (corresponding to a predetermined maximum of zero input data values) and end of block codes (corresponding to an indication that all the subsequent input data values within a current block are zero values and can therefore be ignored) when appropriate data streams are encountered.

12 Claims, 6 Drawing Sheets

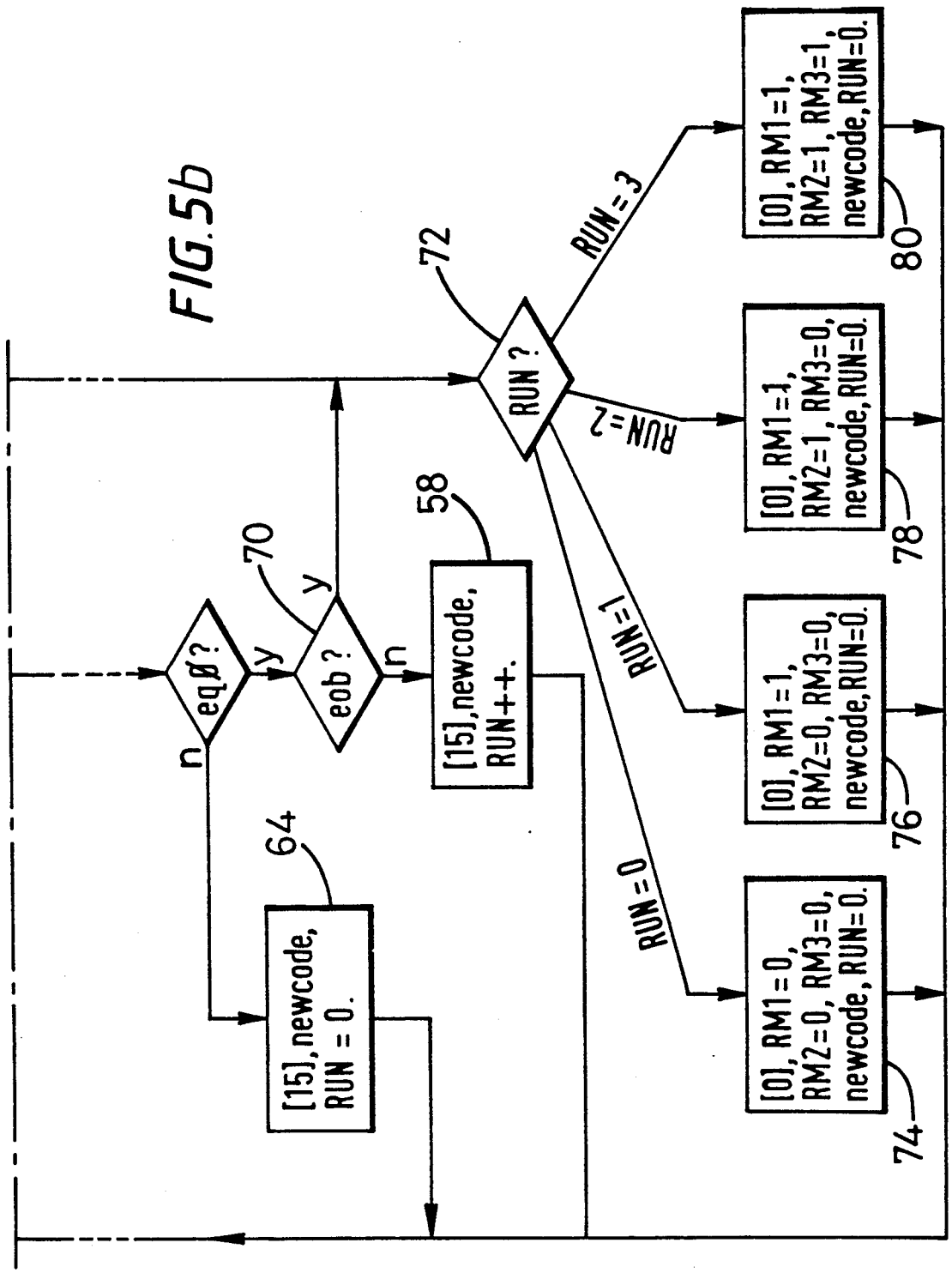

DATA ENCODER FOR PRODUCING AND STORING INFO RUNLENGTH VALUE, BIT LENGTH VALUES AND ENCODED WORDS FROM INPUT DATA VALUES

BACKGROUND OF THE INVENTION

1. Field of the Invention

This invention relates to the field of data encoding. More particularly, this invention relates to runlength type data encoding.

2. Description of the Prior Art

Runlength data encoding to achieve data compression is well known. An example of a system including runlength coding is that proposed by the Joint Photographic Experts Group (JPEG) and currently under review by the International Standards Organisation.

The JPEG standard is intended for the compression of image data in computer systems. The image data is transformed into the spatial frequency domain by discrete cosine transformation. The ac spatial components have a distinctly different character to the dc spatial components. The ac spatial components are subject to runlength coding to exploit the long runs of zero values in this data. The dc spatial components do not show this characteristic.

The JPEG standard proposes the use of code words with the following syntax for the ac data, i.e.

[RUNLENGTH, SIZE], [AMPLITUDE]

In this case RUNLENGTH is the number of zeros preceding a non-zero value. SIZE is the number of bits that will be needed to represent the non-zero value. AMPLITUDE is the non-zero value and has a bit length equal to that specified by SIZE.

Consider the following data stream of image data,
... 0,0,0,7,0,0,0,0,0,0,11,0,0,0 ...

The middle portion, comprising six zeros followed by a non-zero value of 11, would be encoded with the value of RUNLENGTH=6. The non-zero value of 11 will require four bits to represent it, and so SIZE=4. The value of AMPLITUDE is 11, or 1011 in binary. Thus, the sequence 0,0,0,0,0,0,11 is encoded as [6,4], [11].

The JPEG standard proposes the use of code words with the following syntax for the dc data, i.e.

[SIZE], [AMPLITUDE]

Each data value is encoded separately with SIZE being equal to the number of bits needed to represent the value and AMPLITUDE being the value itself. A dc data value of 5 would require three bits to represent and so SIZE=3. AMPLITUDE would then equal 5 or 101 in binary.

Whilst the JPEG standard gives a full description of the encoding format to be used, it does not indicate how such encoding could be achieved in practice. The problems of carrying out the encoding in the non-real time image display systems of the computers for which the JPEG standard is primarily intended are not too great. In a computer system the data can be read into memory and then scanned to identify the RUNLENGTH and SIZE values as a separate operation.

The manner in which the coding can be achieved in a real time video system is less straightforward. The overall data rate in a video system requires the processing of about sixty fields of image data every second to keep pace with the video display. Using a computer system operating under the control of encoding software would not be fast enough to keep pace with this data rate and would be an expensive solution in a situation which does not require the other facilities afforded by the computer system.

SUMMARY OF THE INVENTION

Viewed from one aspect the present invention provides a data encoder comprising:

(i) an input for feeding input data values in parallel to a zero value detector, an encoded word generator and an encoded word bit length indicator;

(ii) a zero runlength counter and an encoder state machine connected in parallel to the output of said zero value detector; and (iii) an encoded data store;

wherein, acting under control of said encoder state machine, said encoded data store receives and stores zero runlength values from said zero runlength counter, encoded word bit length values from said encoded word bit length indicator and encoded words from said encoded word generator.

The invention provides a hardware implementation of the required encoding which yields sufficient processing speed and is also relatively inexpensive.

Another feature of the JPEG standard is that the AMPLITUDE values are encoded so as to handle both positive and negative values. Accordingly, in preferred embodiments of the invention said input data values are decremented if negative by said encoded word generator.

As the data values are fed to the data encoder in the form of multibit words, there is significant redundancy in the most significant bits of these words since few AMPLITUDE values in fact require the use of the full bit width. Accordingly, JPEG uses the SIZE values to ensure that only the significant bits of the AMPLITUDE values need be incorporated within in the compressed data stream. In order to calculate these SIZE values at the full data rate, in preferred embodiments of the invention, said encoded word bit length indicator includes a lookup table mapping input data values to encoded word bit lengths.

The end of block or end of scan codes ([0, 0]) of the JPEG standard improves the degree of compression achieved by the technique. The generation of these special codes whilst retaining overall performance is not straightforward. Accordingly, preferred embodiments of the invention in which said input data values are grouped into blocks of predetermined length, further comprise an end of block indicator coupled to said encoder state machine for prompting generation of an end of block code.

Another special code that is required is the continuation code ([15, 0]) to handle long runlengths of zero values. Preferred embodiments of the invention deal with this by providing that said zero runlength counter counts up to a predetermined maximum number of zero input data values and then prompts generation of a continuation code.

As described above, the invention provides fast data encoding thereby meeting the primary requirements for use in systems such as real time video data compression. The input data values are handled one at a time as they are fed to the data encoder to produce the runlength codes on a real time basis. However, whilst this operation provides a degree of simplicity in subsequent processing stages, it does have an inherent problem in implementing the full JPEG standard.

Consider the situation in which either a full block of data or a large final portion thereof is composed entirely of zero values. The above describe simple approach to encoding such data will result in the generation of one or more continuation codes followed by an end of block code when the end of block input data value is eventually reached. This is not the most efficient encoding result. Greater compression would be achieved if the system were to be able to detect that all the values between the present value and the end of the block were zeros so that an end of block code could be inserted without the unnecessary additional overhead of several intervening continuation codes being incurred. Unfortunately, with the simple approach this is not possible since the data representing the last part of the block is not available until after the continuation codes have already been generated. It is not possible to look ahead in the data stream to detect that all the input data values up to the end of block are zeros. Accordingly, preferred embodiments of the invention are able to retain their real time operation and yet avoid generation of spurious continuation codes by providing a pipeline delay unit for buffering encoded data prior to storage in said encoded data store, and means responsive to said end of block indicator and coupled to said pipeline delay unit for removing from said encoded data within said pipeline delay unit any preceding continuation codes adjacent to an end of block code.

In order to control the action of these additional circuit elements in relation to those of the rest of the circuit, preferred embodiments of the invention employ a clock signal, derived from said encoder state machine to occur at times when valid zero runlength values, encoded word bit length values and encoded words are being generated, to coordinate operation of said pipeline delay unit and said means responsive to said end of block indicator with said times.

Viewed from a second aspect the invention provides a data encoding method comprising the steps of:
(i) feeding input data values in parallel to a zero value detector, an encoded word generator and an encoded word bit length indicator;
(ii) coupling a zero runlength counter and an encoder state machine in parallel to the output of said zero value detector; and
(iii) under control of said encoder state machine, receiving and storing into an encode data store zero runlength values from said zero runlength counter, encoded word bit length values from said encoded word bit length indicator and encoded words from said encoded word generator.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 5a and 5b illustrate the operation of the embodiment of FIG. 4.

DESCRIPTION OF THE PREFERRED EMBODIMENTS

The embodiments of FIG. 1 to 5 are shown in a form configured to encode ac scan data into the JPEG format. The encoding of dc scanned data can be regarded as a subset of ac scan data. The embodiments illustrated can be adapted to scan the dc data by suppressing operation of the runlength counter and ensuring that a "newcode" signal is issued for every clock cycle/input data value.

Figure 1:
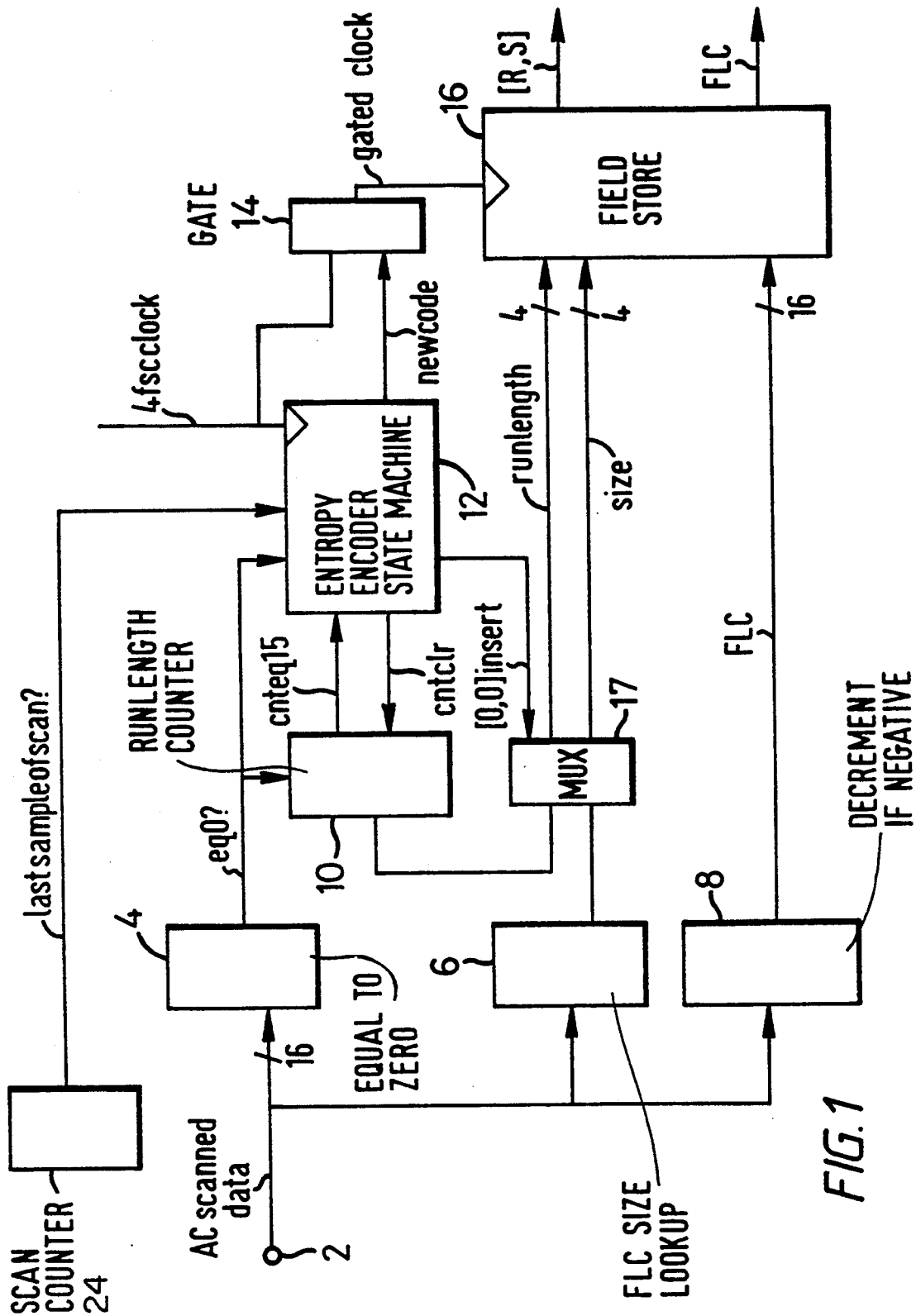
FIG. 1 illustrates a first embodiment of the invention.

Turning now to FIG. 1, the sixteen bit input data values are input to node 2. The input data values are then fed in parallel to a zero value detector 4, an encoded word bit length indicator 6 and an encoded word generator 8. The "eq0" signal is a "1" if the input data value is equal, to zero, and is an "0" if the input data value is non-zero.

The encoded word bit length indicator 6 comprises a look up table, which may be stored in a PROM, for mapping input data values into encoded word bit length values. The encoded word may also be referred to as the fixed length code or FLC. The output from the encoded word bit length indicator 6 corresponds to the SIZE value specified in the JPEG standard and has a bit width of four.

The encoded word generator 8 carries out encoding by decrementing the input data value if it is negative to produce a sixteen bit encoded word (FLC) from each input data value.

The output "eq0" signal from the zero value detector 4 is fed to both a runlength counter 10 and an encoder state machine 12. If the "eq0" signal is a "1", then the runlength counter 10 increments its current value by one and the encoder proceeds to the next input data value. If the "eq0" signal is a "0", then this triggers the encoder state machine 12 to issue a "newcode" signal with a value of "1" and the runlength counter is not incremented.

The "newcode" signal is logically ANDed with the "clock" signal by gate 14 to generate a "gated clock" signal fed to the encoded data store 16. Upon receipt of the "gated clock" signal, the encoded data store 16 reads the current values being outputted by the runlength counter 10, the encoded word bit length indicator 6 and the encoded word generator 8, i.e. the encoded data store 16 stores a [RUNLENGTH,SIZE], [AMPLITUDE] word pair. Unless triggered to do so by the "gated clock" signal the encoded data store 16 otherwise ignores the values inputted to it. The encoder state machine then issues a "cntclr" signal to reset the runlength counter 10.

The encoder state machine 12 also generates "newcode" signal when the value stored within the runlength counter is equal to 15 and a further zero input data value is received. In this circumstance the data encoder triggers generations of a continuation code of [15,0]. This code is composed of the value of fifteen stored within the runlength counter 10 and a value of zero derived from its lookup table by the encoded word bit length indicator 6 from the current zero input data value. The four bit runlength counter 10 undergoes wrap round to return to a value of zero.

A scan counter 24 counts the number of data values within the current block of ac data that have been encoded. When the last input data value is reached the "lastsampleofscan" signal becomes a "1". This triggers the encoder state machine to prompt generation of an end of block code ([0, 0]) either directly if the current sample value is zero or after the last data code has been issued if the current sample value is non-zero. This code is multiplexed into the data stream by multiplexer 17 acting under control of the "[0, 0]insert" signal. At all other times the multiplexer 17 passes the RUN-LENGTH and SIZE values from the runlength counter 10 and encoder word bit length indicator 6.

TABLE 1

| A | B | C | D | E | F | G | H | I | J | Comments |
|---|---|---|---|---|---|---|---|---|---|---|
| 0 | 0 | 1 | 0 | 0 | 1 | 0 | — | — | C | |
| 0 | 0 | 1 | 0 | 0 | 2 | 0 | — | — | C | |
| 0 | 0 | 1 | 0 | 0 | 3 | 0 | — | — | C | |
| +1 | 0 | 0 | 0 | 1 | 3 | 1 | [3,1] | 1 | A | |
| 0 | 0 | 1 | 0 | 0 | 1 | 0 | — | — | C | |
| −1 | 0 | 0 | 0 | 1 | 1 | 1 | [1,1] | 0 | A | |
| 0 | 0 | 1 | 0 | 0 | 1 | 0 | — | — | C | |
| 0 | 0 | 1 | 0 | 0 | 2 | 0 | — | — | C | |
| 0 | 1 | 1 | 0 | 0 | 3 | 1 | [0,0] | — | B | EOB Code |
| 0 | 0 | 1 | 0 | 0 | 1 | 0 | — | — | C | |
| +2 | 0 | 0 | 0 | 1 | 1 | 1 | [1,2] | 2 | A | |
| +3 | 0 | 0 | 0 | 1 | 0 | 1 | [0,2] | 3 | A | |
| 0 | 0 | 1 | 0 | 0 | 1 | 0 | — | — | C | |
| 0 | 0 | 1 | 0 | 0 | 2 | 0 | — | — | C | |
| 0 | 0 | 1 | 0 | 0 | 3 | 0 | — | — | C | |
| 0 | 0 | 1 | 0 | 0 | 4 | 0 | — | — | C | |
| 0 | 0 | 1 | 0 | 0 | 5 | 0 | — | — | C | |
| 0 | 0 | 1 | 0 | 0 | 6 | 0 | — | — | C | |
| 0 | 0 | 1 | 0 | 0 | 7 | 0 | — | — | C | |
| 0 | 0 | 1 | 0 | 0 | 8 | 0 | — | — | C | |
| 0 | 0 | 1 | 0 | 0 | 9 | 0 | — | — | C | |
| 0 | 0 | 1 | 0 | 0 | 10 | 0 | — | — | C | |
| 0 | 0 | 1 | 0 | 0 | 11 | 0 | — | — | C | |
| 0 | 0 | 1 | 0 | 0 | 12 | 0 | — | — | C | |
| 0 | 0 | 1 | 0 | 0 | 13 | 0 | — | — | C | |
| 0 | 0 | 1 | 0 | 0 | 14 | 0 | — | — | C | |
| 0 | 0 | 1 | 0 | 0 | 15 | 0 | — | — | C | |
| 0 | 0 | 1 | 1 | 0 | 0 | 1 | [15,0] | — | D | Cont. Code |
| 0 | 0 | 1 | 0 | 0 | 1 | 0 | — | — | C | |
| −3 | 0 | 0 | 0 | 1 | 1 | 1 | [1,2] | 0 | A | |

In Table 1 the following reference symbols are used:
A = AC Scanned Data
B = "lastsampleofscan" signal
C = "eq0" signal
D = "cnteq15" signal
E = "cntclr" signal
F = runlength counter value
G = "newcode" signal
H = [RUNLENGTH, SIZE] word written into field store
I = FLC written into field store
J = state occupied by encoder state machine Table 1 illustrates an example of the signal values from various points within the data encoder of FIG. 1 during encoding of the input data stream. As can be seen, the example shows the generation of five standard codes, an end of block code and a continuation code. The column indicating the current state of the encoder state machine 12 is filled with the letter A, B, C and D to represent the different states of the encoder state machine 12.

State C corresponds to receipt of a zero input data value resulting in the incrementing of the runlength counter 10. State A corresponds to receipt of a non-zero input data value triggering generation of a "newcode" signal. States B and D correspond respectively to the states in which an end of block code and a continuation code are prompted to be generated.

Figure 2:
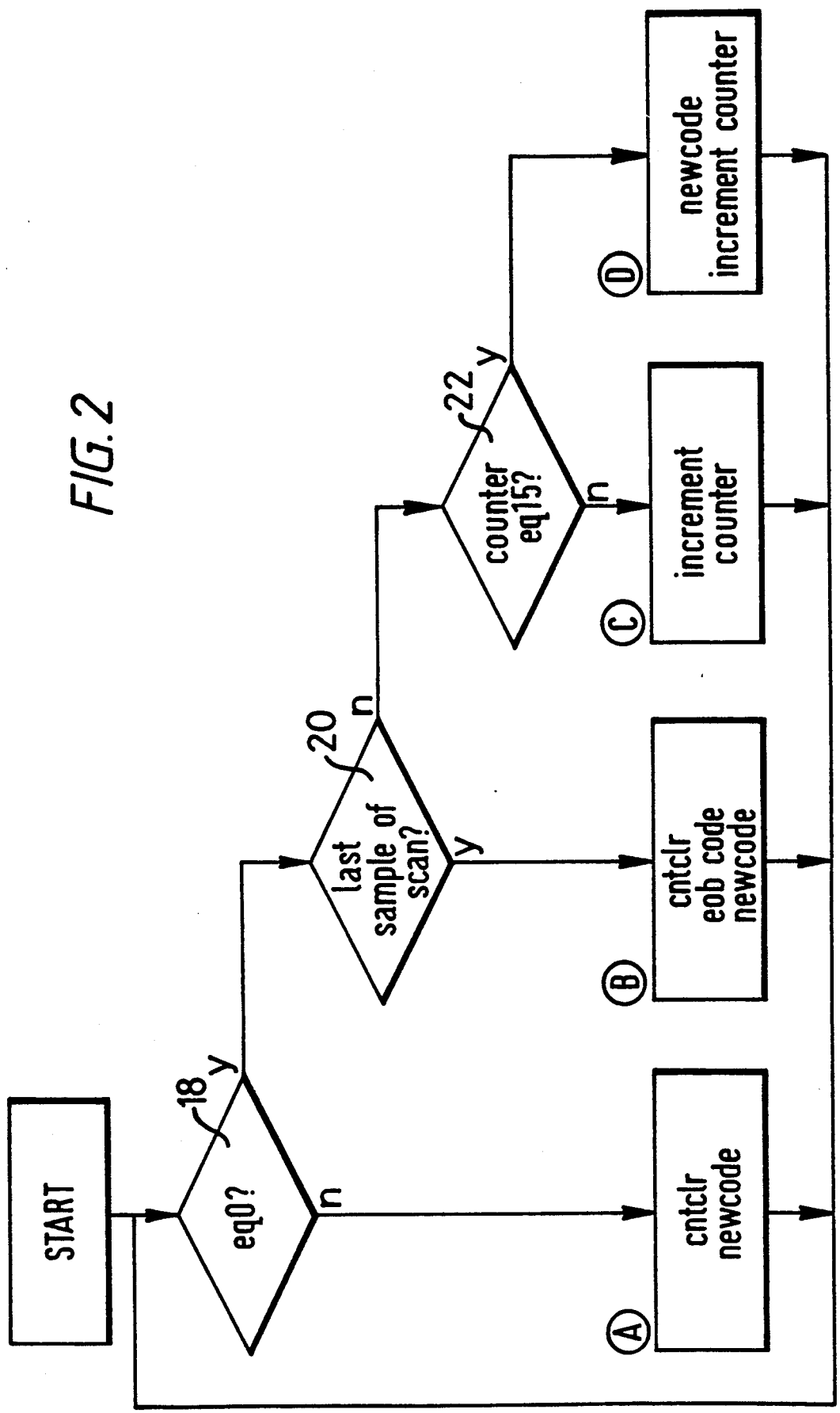
FIG. 2 illustrates the flow of control within and operation of the embodiment of FIG. 1.

FIG. 2 schematically illustrates the operation of the embodiment of FIG. 1. The test for whether the current input data value is a zero is shown at stage 18. If the answer is no then the encoder state machine 12 enters state A resulting in a "cntclr" signal and "newcode" signal being generated before return to stage 18. If the test at stage 18 is answered yes, then stage 20 tests as to whether the end of the current block has been reached.

If the end of the current block has been reached, then the encoder state machine 12 enters state B resulting in a "cntclr" signal, a "newcode" signal and an end of block code being generated prior to return to stage 18. If the result of the test at stage 20 is no, then control is passed to stage 22.

The test at stage 22 is whether or not fifteen preceding zero input data values have been received. If the answer is no, then the runlength counter 10 is incremented by the encoder state machine 12 by entering state C prior to return to stage 18. If the answer at stage 22 is yes, then a "newcode" signal is generated forcing the production of a continuation code and corresponding to the encoding state machine being in state D. In state D there is no need for the runlength counter 10 to be cleared as the incrementing by the latest zero value to be received will result in a wrap round to zero of the stored value.

Figure 3:
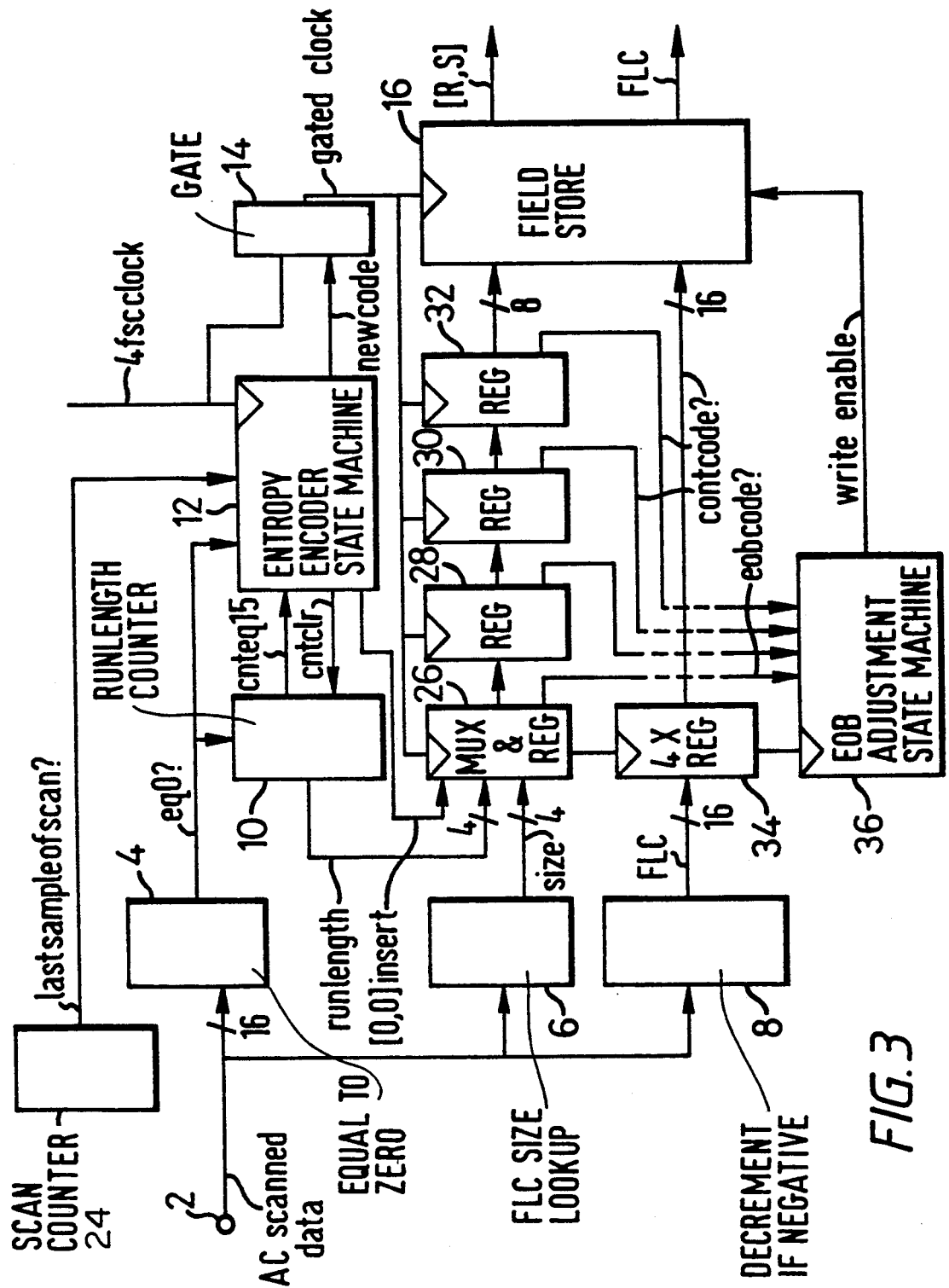
FIG. 3 illustrates a second embodiment of the invention.

FIG. 3 illustrates a second embodiment of a data encoder. Those elements of FIG. 3 that correspond to the same elements in FIG. 1 bare the same reference numerals and operate in the same manner. The major difference between the embodiment of FIG. 3 and that of FIG. 1 is the introduction of a pipeline delay unit composed of the elements 26, 28, 30, 32 and 34 and the end of block adjustment state machine 36. The pipeline delay unit 26, 28, 30, 32, 34 serves to introduce a four word delay between generation of values by the runlength counter 10, encoder word bit length indicator 6 and encoded word generator 8 and their subsequent arrival at the inputs to the encoded data store 16.

The "gated clock" signal produced by the gate 14 is fed to the elements forming the pipeline delay unit 26, 28, 30, 32 and 34. This controls the registers to read in a newly generated code and advance the existing stored codes along the pipeline only at the points in time at which valid runlength codes are being presented at their inputs. The "gated clock" signal is also passed to the end of block adjustment state machine 36 via the four times register 34. The "gated clock" signal controls the end of block adjustment state machine 36 to carry out a reevaluation of the "write enable" signal in a manner coordinated with the generation of new runlength code and the advance of these code through the pipeline delay unit 26, 28, 30, 32, 34.

The multiplexer and register 26 serves the combined purpose of multiplexing into the data stream of end of block codes ([0, 0]), as prompted by the encoder state machine 12, as well as testing for the presence of such a code and feeding the result to the end of block adjustment state machine 36. When an end of block code is detected by the multiplexer register 26, then the values stored in the registers 28, 30 and 32 are tested to see if they are continuation codes ([15,0]). The end of block adjustment state machine 36 then turns the "write enable" signal to "0" for a period necessary to suppress storage of unnecessary continuation codes by the encoded data store 16.

It is important to realize that any continuation codes that are to be removed should be present as a continuous sequence adjacent the end of block code. Accordingly, either one, two or three continuation codes may be removed. If one continuation code is being removed, then it must be within register 28. It would be incorrect to remove a continuation code from register 32 if the codes within registers 28 and 30 were not also continuation codes since in this circumstance the continuation code within register would be valid and in fact necessary fop the correct encoding of the data. Similarly, if two continuation codes ape to be removed then these must be present in registers 28 and 30.

TABLE 2

| A | B | C | D | E | F | G | H | I | J |
|---|---|---|---|---|---|---|---|---|---|
| [3,1] | 1 | 0 | 0 | 0 | 0 | 1 | [3,1] | 1 | |
| [1,1] | 0 | 0 | 0 | 0 | 0 | 1 | [1,1] | 0 | |
| [0,0] | — | 1 | 0 | 0 | 0 | 1 | [0,0] | — | |
| [1,2] | 2 | 0 | 0 | 0 | 0 | 1 | [1,2] | 2 | |
| [0,2] | 3 | 0 | 0 | 0 | 0 | 1 | [0,2] | 3 | |
| [15,0] | — | 0 | 0 | 0 | 0 | 1 | [15,0] | — | |
| [1,2] | 0 | 0 | 1 | 0 | 0 | 1 | [1,2] | 0 | |
| [15,0] | — | 0 | 0 | 1 | 0 | 0 | — | — | * |
| [15,0] | — | 0 | 1 | 0 | 1 | 0 | — | — | * |
| [15,0] | — | 0 | 1 | 1 | 0 | 0 | — | — | * |
| [0,0] | — | 1 | 1 | 1 | 1 | 1 | [0,0] | — | |
| [15,0] | — | 0 | 0 | 0 | 0 | 0 | — | — | * |
| [15,0] | — | 0 | 1 | 0 | 0 | 0 | — | — | * |
| [0,0] | — | 1 | 1 | 1 | 0 | 1 | [0,0] | — | |
| [15,0] | — | 0 | 0 | 0 | 0 | 0 | — | — | * |
| [0,0] | — | 1 | 1 | 0 | 0 | 1 | [0,0] | — | |
| [15,0] | — | 0 | 0 | 1 | 0 | 1 | [15,0] | — | |
| [15,0] | — | 0 | 1 | 0 | 1 | 1 | [15,0] | — | |
| [15,0] | — | 0 | 1 | 1 | 0 | 1 | [15,0] | — | |
| [3,1] | 1 | 0 | 1 | 1 | 1 | 1 | [3,1] | 1 | |

In Table 2 the following reference codes are used:
A = [RUNLENGTH, SIZE] code word generated
B = FLC generated
C = "eobcode" signal
D = "contcode1" signal
E = "contcode2" signal
F = "contcode3" signal
G = "write enable" signal
H = [RUNLENGTH, SIZE] code word written into field store
I = FLC written into field store
J = continuation codes rejectd marked with "*"

The operation of the embodiment FIG. 3 is illustrated Table 2. The example of Table 2 shows the removal of 3, 2 and i unnecessary continuation codes by an appropriate switching of the "write enable" signal prior to the occurrence of an end of block code. The rest of the operation of the embodiment of FIG. 3 corresponds to that illustrated by Table 1.

Figure 4:
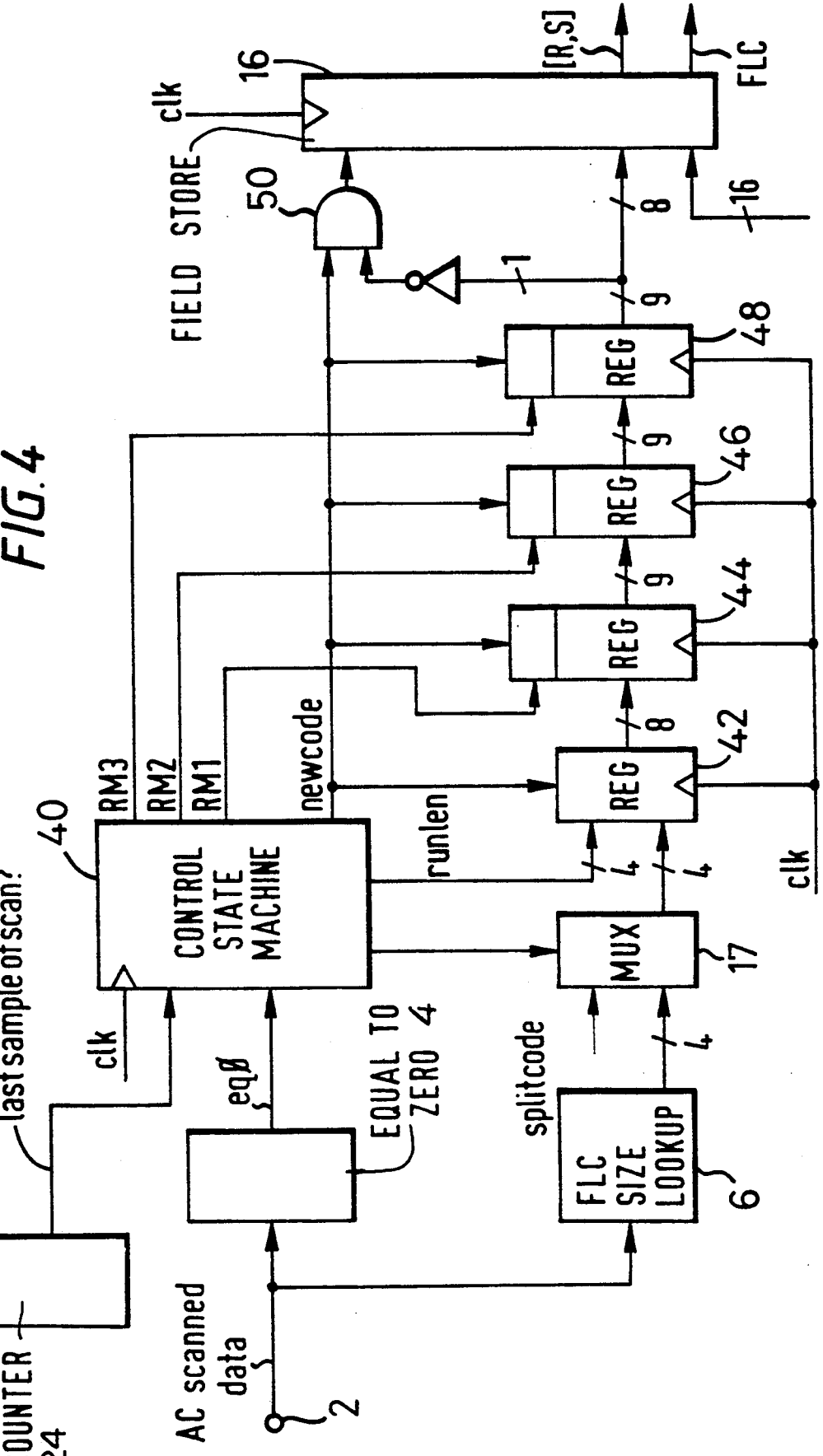
FIG. 4 illustrates a part of a third embodiments of the invention.

FIG. 4 illustrates a part of a third embodiment of the invention. In comparison with the embodiment of FIG. 3, the functions of the runlength counter 10 and end of block adjustment state machine 36 have been merged (integrated) with the encoder state machine 12 to provide a control state machine 40 performing all the functions of the aforementioned devices. The pipeline delay comprises an 8-bit register 42 and three 9-bit registers 44, 46, 48. The extra bit in the 9-bit registers 44, 46, 48 serves as a flag to indicate whether the data stored within the remaining 8-bits of the 9-bit register is valid data that should be written into the field store 16. When the end of a block is reached, the flags in the 9-bit registers 44, 46, 48 are set in dependence upon whether they contain continuation codes that should be ignored since they are adjacent the end of block with no intervening valid data.

In the embodiments of FIGS. 1 and 3, a gated clock was used to control writing to the field store 16. Such an approach is satisfactory when utilising discrete components that afford the ability to adjust signal timings so as to ensure correct operation of the gated clock. When it is desired to use a higher degree of integration (e.g. application specific integrated circuits (ASICs)), then the ability to adjust signal timings so as to produce the correct operation of the gated clock is lost and this approach is no longer appropriate.

In the embodiment of FIG. 4, the field store 16 is supplied with a standard clock signal and a write enable signal in respect of all codes from an AND gate 50. The AND gate 50 logically combines a clock enable signal 'newcode' from the control state machine 40 and the inverse of the flag bit currently being output from the 9-bit register 48. In this way, the critical requirements upon signal timing are eased.

Figure 5A:
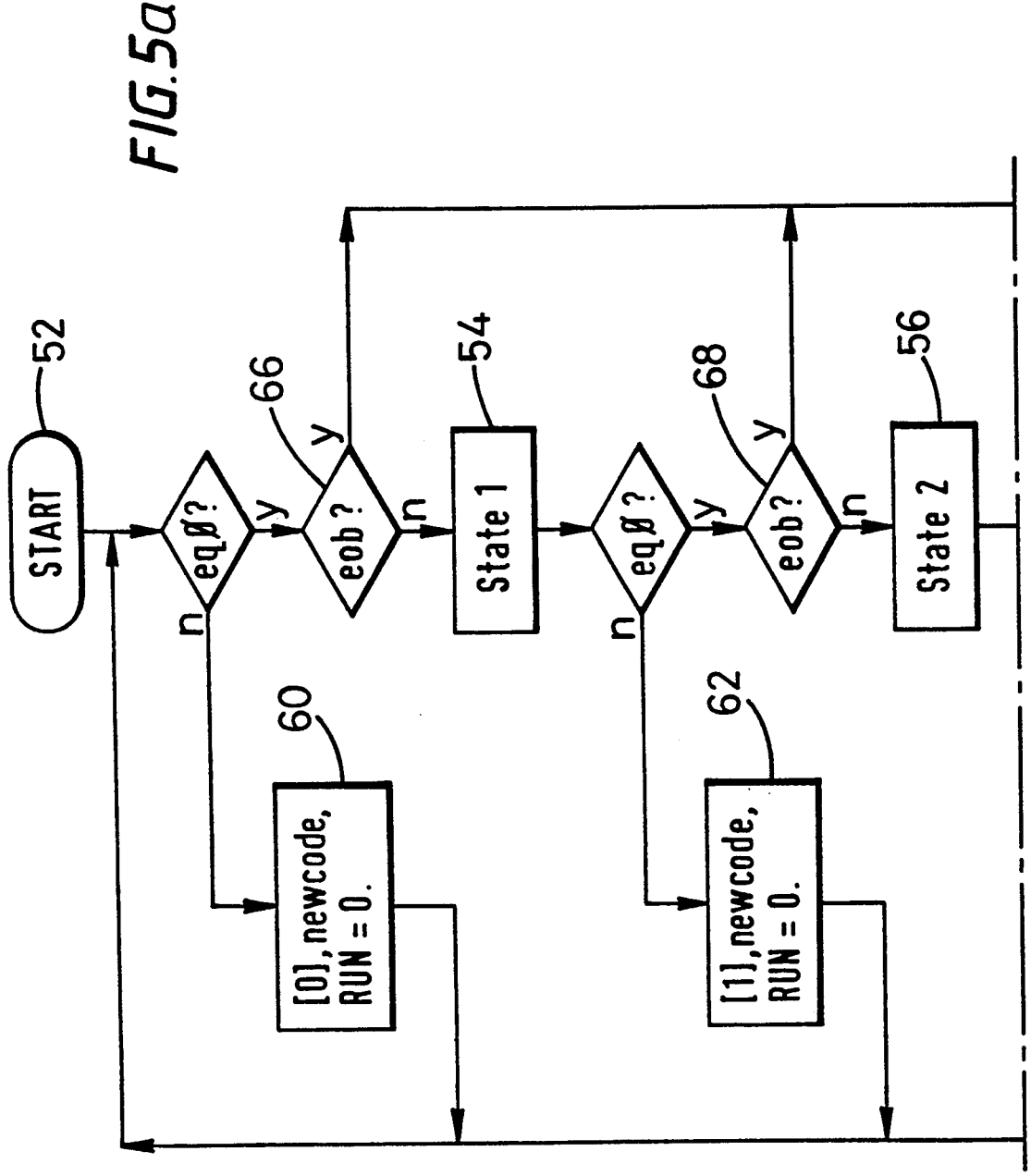

FIGS. 5a and 5b illustrate the operation of the control state machine 40 of FIG. 4. From the starting state 52, the control state machine 40 passes through a sequence of states 54, 56, 58 etc. in response to input signals 'eq0' and 'lastsampleofscan' respectively indicating whether the current input AC scan data has a zero value and whether the end of a data block has been reached. When a non-zero data value is input, the state machine enters one of the states 60, 62 and 64 for initiating generation of an "[R,S], FLC" code word pair. In dependence upon how many zero values have preceded the non-zero value, an appropriate value of R indicated by [0], [1]...[15] is output as the value RUNLEN to the 8-bit register 42 of FIG. 4. In addition, the clock enable signal 'newcode' is asserted high and the variable RUN is reset to a zero value.

If 16 consecutive zero valued AC scanned data values are received, then the state 58 is entered whereupon a continuation code [15, 0] is issued and the value of RUN is incremented.

When an end of block code is detected in one of steps 66, 68 and 70, the system passes to step 72 whereupon the value of the variable RUN is tested. In dependence upon the value of RUN, the system enters one of states 74, 76, 78 or 80. In each of these states 74, 76, 78 and 80, the value of R is set to zero as indicated by [0], the clock enable signal 'newcode' is asserted and the value of RUN is reset to zero.

The value of RUN determined by step 72 indicates how many continuation codes [15, 0] preceded the end of block. If RUN equals zero then the variables RM1, RM2 and RM3 are all set to zero indicating that there are no continuation codes in any of the 9-bit registers 44, 46 or 48 of FIG. 4. Accordingly each of the flags of the 9-bit registers 44, 46 and 48 remains valid. If one continuation code preceded the end of block code, then RUN would be equal to one at step 72 and RM1 would be set to 1 so as to inhibit that continuation code being stored in the field store 16 of FIG. 4. The values of RM1, RM2 and RM3 are respectively set to 0,0,0; 1,0,0; 1,1,0; and 1,1,1 in dependence upon whether the value of RUN is 0,1,2 or 3. When the validity bits of the 9-bit registers 44, 46 and 48 have been so set, the control state machine 40 of FIG. 4 returns to its reset state to start the decoding process for the next block.

Although illustrative embodiments of the invention have been described in detail herein with reference to the accompanying drawings, it is to be understood that the invention is not limited to those precise embodiments, and that various changes and modifications can be effected therein by one skilled in the art without departing From the scope and spirit of the invention as defined by the appended claims.

I claim:
1. A data encoder comprising:
   (i) an input for feeding input data values in parallel to a zero value detector for detecting zero values in said input data values, an encoded word generator for generating a plural-bit encoded word representing a non-zero value of an input data value and an encoded word bit length indicator for generating a bit length value to indicate the number of bits of said plural-bit word;

(ii) a zero runlength counter and an encoder state machine connected in parallel to said zero value detector, said zero runlength counter producing a zero runlength value representing the length of successive zero values in said input data values; and (iii) an encoded data store;

wherein, acting under control of said encoder state machine, said encoded data store receives and stores zero runlength values from said zero runlength counter, bit length values from said encoded word bit length indicator and encoded words from said encoded word generator.

2. A data encoder as claimed in claim 1, in which said data encoder is operable with input data values representing image data.

3. A data encoder comprising:
(i) an input for feeding input data values in parallel to a zero value detector, an encoded word generator and an encoded word bit length indicator;
(ii) a zero runlength counter and an encoder state machine connected in parallel to said zero value detector; and
(iii) an encoded data store;
wherein, acting under control of said encoder state machine, said encoded data store receives and stores zero runlength values from said zero runlength counter, encoded word bit length values from said encoded word bit length indicator and encoded words from said encoded word generator, and said input data values are decremented if negative by said encoded word generator.

4. A data encoder comprising:
(i) an input for feeding input data values in parallel to a zero value detector, an encoded word generator and an encoded word bit length indicator; said encoded word bit length indicator includes a lookup table mapping input data values to encoded word bit lengths;
(ii) a zero runlength counter and an encoder state machine connected in parallel to said zero value detector; and
(iii) an encoded data store;
wherein, acting under control of said encoder state machine, said encoded data store receives and stores zero runlength values from said zero runlength counter, encoded word bit length values from said encoded word bit length indicator and encoded words from said encoded word generator.

5. A data encoder comprising:
(i) an input for feeding input data values in parallel to a zero value detector, an encoded word generator and an encoded word bit length indicator;
(ii) a zero runlength counter and an encoder state machine connected in parallel to said zero value detector; and
(iii) an encoded data store, said input data values being grouped into blocks of predetermined length, and further comprising an end of block indicator coupled to said encoder state machine for prompting generation of an end of block code;
wherein, acting under control of said encoder state machine, said encoded data store receives and stores zero runlength values from said zero runlength counter, encoded word bit length values from said encoded word bit length indicator and encoded words from said encoded word generator.

6. A data encoder as claimed in claim 4, wherein said zero runlength counter counts up to a predetermined maximum number of zero input data values and then prompts generation of a continuation code and further comprising a pipeline delay unit for buffering encoded data prior to storage in said encoded data store, and means responsive to said end of block indicator and coupled to said pipeline delay unit for removing from said encoded data within said pipeline delay unit any preceding continuation Codes adjacent an end of block code.

7. A data encoder as claimed in claim 6, wherein a clock signal, derived from said encoder state machine to occur at times when valid zero runlength values, encoded word bit length values and encoded words are being generated, coordinates operation of said pipeline delay unit and said means responsive to said end of block indicator with said times.

8. A data encoder as claimed in claim 6, wherein said pipeline delay unit comprises a plurality of data registers, at least one of said data registers including means for storing a flag indicating whether or not a continuation code store in said data register should be stored within said encoded data store.

9. A data encoder as claimed in claim 6, wherein said zero runlength counter and said encoder state machine are integrated to form a control state machine that generates a storage enable signal for controlling storage of encoded data within said encoded data store and said means responsive to said end of block indicator is integrated with said control state machine.

10. A data encoder comprising:
(i) an input for feeding input data values in parallel to a zero value detector, an encoded word generator and an encoded word bit length indicator;
(ii) a zero runlength counter and an encoder state machine connected in parallel to said zero value detector; and
(iii) an encoded data store;
wherein, acting under control of said encoder state machine, said encoded data store receives and stores zero runlength values from said zero runlength counter, encoded word bit length values from said encoded word bit length indicator and encoded words from said encoded word generator; and wherein said zero runlength counter counts up to a predetermined maximum number of zero input data values and then prompts generation of a continuation code.

11. A data encoder comprising:
(i) an input for feeding input data values in parallel to a zero value detector, an encoded word generator and an encoded word bit length indicator;
(ii) a zero runlength counter and an encoder state machine connected in parallel to said zero value detector; and
(iii) an encoded data store;
wherein, acting under control of said encoder state machine, said encoded data store receives and stores zero runlength values from said zero runlength counter, encoded word bit length values from said encoded word bit length indicator and encoded words from said encoded word generator; and
wherein said zero runlength counter and said encoder state machine are integrated to form a control state machine that generates a storage enable signal for controlling storage of encoded data within said encoded data store.

12. A data encoding method comprising the steps of:
(i) feeding input data values in parallel to a zero value detector which detects zero values in said input data values, an encoded word generator which generates a plural-bit encoded word representing a non-zero value of an input data value and an encoded word bit length indicator which generates a bit length value to indicate the number of bits of said plural-bit word;

(ii) coupling a zero runlength counter and an encoder state machine in parallel to said zero value detector, said zero runlength counter producing a zero runlength value representing the length of successive zero values in said input data values; and (iii) under control of said encoder state machine, receiving and storing into an encode data store zero runlength values from said zero runlength counter, bit length values from said encoded word bit length indicator and encoded words from said encoded word generator.

* * * * *